June 25, 1968    V. A. HORDIS    3,389,522
GLASS UNIT AND METHOD

Filed April 20, 1966    2 Sheets-Sheet 1

INVENTOR
VICTOR A. HORDIS
BY
ATTORNEYS

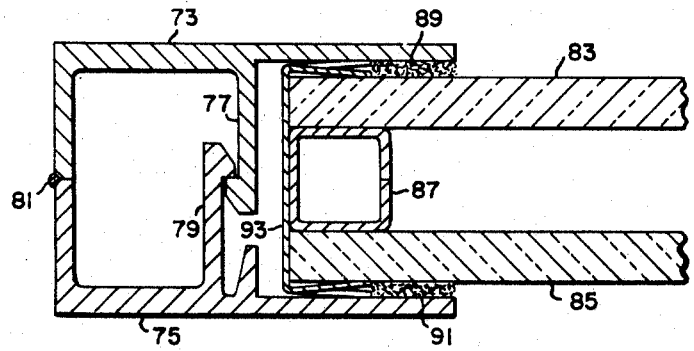
FIG. 4.
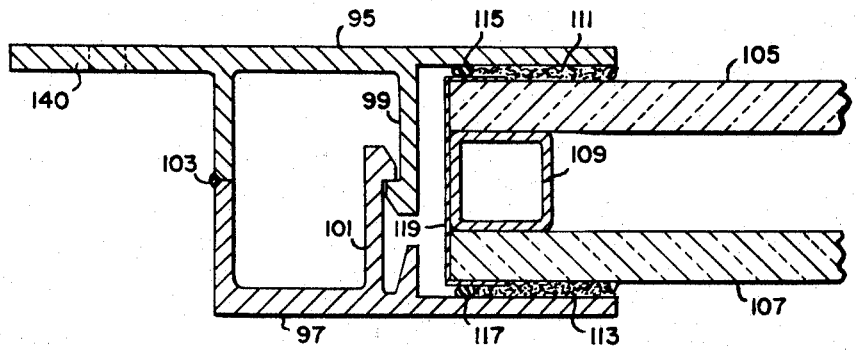
FIG. 5.
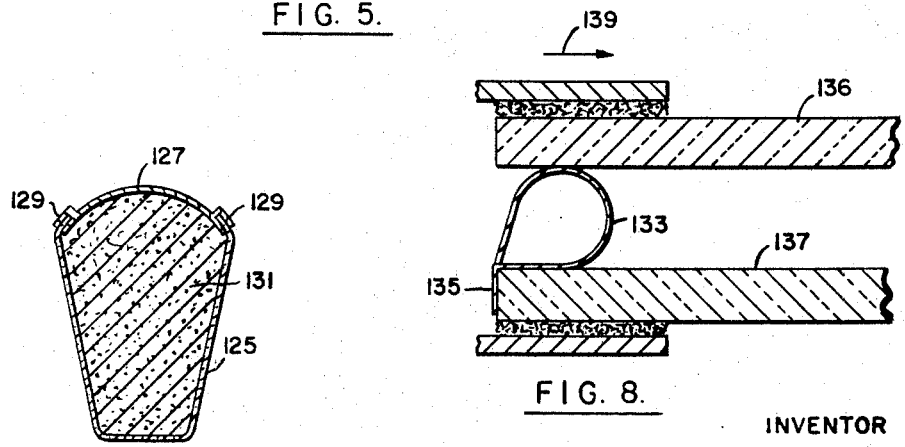
FIG. 7.
FIG. 8.
INVENTOR
VICTOR A. HORDIS
BY
ATTORNEYS

United States Patent Office 3,389,522
Patented June 25, 1968

3,389,522
GLASS UNIT AND METHOD
Victor A. Hordis, Riverton, N.J., assignor to Hordis Brothers, a partnership, Pennsauken, N.J.
Filed Apr. 20, 1966, Ser. No. 543,929
25 Claims. (Cl. 52—401)

ABSTRACT OF THE DISCLOSURE

A hermetically-sealed, multiple-pane insulating glass unit and method of making it including forming a first half-frame having a snap-action locking means extending therefrom, forming a second half-frame having a snap-action locking means extending therefrom, applying a sealant along the inner face of each half-frame, setting a first glass sheet on the sealant of the first half-frame, setting a second glass sheet on the sealant of the second half-frame, laying a glass-separating member along the edge of one of the glass sheets, and pressing the half-frames together to cause the locking means to snap together and lock the unit into a complete assembly. The half-frames have outer edges which abut, and the method further includes the steps of exerting an outward pressure on the inner faces of the glass sheets by means of the glass-separating member, and transferring that locking pressure through the locking means to exert an inward pressure on the abutting edges of the half-frames to force them together.

---

This invention relates to a glass unit and a method, and more particularly concerns a hermetically sealed, multiple pane insulating glass unit and a method of making it.

The glass unit of this invention is especially useful as an insulated patio door, and as a large size insulated window. Presently, insulated patio doors consist of a pre-assembled, hermetically sealed, multiple pane glass unit which is later installed into a heavy structural aluminum, wood, or stainless steel framework, in much the same manner as that in which a door including but a single sheet of glass is assembled. A vinyl U-shaped sealing channel is assembled around the edges of the glass pane, and in some cases this vinyl channel is even welded at the corners in order to make a tight seal. Then the previously cut aluminum, wood, or stainless steel sections of the door are hammered over the vinyl channel, and the sections are fastened together, usually with screws. The glass panes are held rigidly in the assembled door by the pressure of the hammered-over frame section against the vinyl channel. This pressure, along with the strength of the heavy metal or wood section, is relied upon to keep the frame from bowing under operating stresses at the location where the handle is attached to the door. The glass panes are not integrated into the structure of the door, and do not contribute any appreciable strength thereto.

It is an object of the present invention to provide a glass unit wherein the glass panes add strength to the assembled unit, thus decreasing the amount of metal needed for structural stability.

It is another object of the invention to provide a hermetically sealed, multiple pane glass unit wherein the frame forms a part of the sealing system of the unit, making it unnecessary to use an already sealed glass pane unit in the construction of such units as insulated patio doors and large insulating windows.

It is another object to provide a hermetically sealed, multiple pane glass unit which snaps into locking position during assembly.

It is another object of this invention to provide a hermetically sealed, multiple pane glass unit with means of exerting an adequate and constant sealing pressure after assembly.

It is another object of this invention to provide a means of achieving and maintaining the desired thickness and confinement of the glass to metal, or metal to metal, sealant, when this is desirable due to the characteristics of the sealant.

Other objects and advantages of this invention, including its simplicity and economy, will further become apparent hereinafter and in the drawings, in which:

FIG. 4 is a view similar to FIG. 2 of another embodiment of the invention;

FIG. 5 is a view similar to FIG. 2 of another embodiment of the invention;

FIG. 7 is a view in section of a separator which may be used between glass panes; and FIG. 8 is a view in section of another separator.

Figure 1:
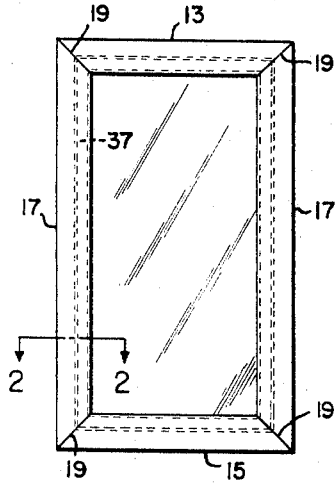
FIG. 1 is a view in front elevation of a hermetically sealed, multiple pane glass unit constructed in accordance with this invention.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown a hermetically sealed multiple pane insulating glass unit, FIG. 1, which includes a top member 13, a bottom member 15, and two side members 17, with the top and bottom members being connected to the side members along welds 19. The glass unit is formed of a first half-frame 21, FIG. 2, and a second half-frame 23 which are connected together by snap-action locking members 25 and 27 which extend from half frames 21 and 23 and have hook portions 29 and 31 that engage each other and hold the half-frames 21 and 23 together.

A first glass pane 33 and second glass pane 35 are located between half-frames 21 and 23 with a separator 37 therebetween. An effective insulating glass unit sealant 39 is positioned between first half-frame 21 and first glass pane 33, while the same type sealant 41 is positioned between second half-frame 23 and second glass pane 35.

The outer edges of the half-frames abut and are hermetically sealed together by a weld 43.

A quantity of desiccant 143 is enclosed inside the assembly to free the air space of entrapped moisture and volatile vapors, if present.

Figure 2:
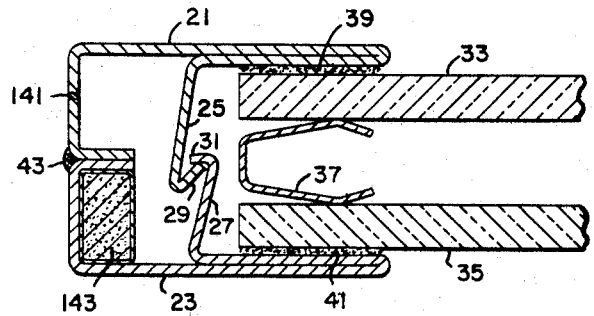
FIG. 2 is a view in section taken as indicated by the lines and arrows 2—2 which appear in FIG. 1.
Figure 3:
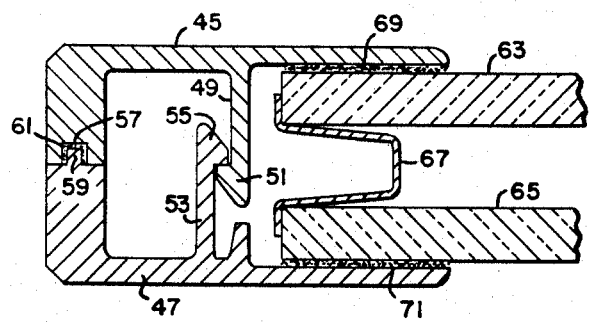
FIG. 3 is a view similar to FIG. 2 of another embodiment of the invention.

FIG. 2 illustrates half-frames 21 and 23 which are made from rolled steel or aluminum sections while FIG. 3 illustrates half-frames 45 and 47 made from extruded sections. In FIG. 3, a snap-locking member 49 having a hook portion 51 extends from half-frame 45 and a snap-locking member 53 having a hook portion 55 extends from half-frame 47. The outer edges of half-frames 45 and 47 abut, and the edge of half-frame 45 has a groove 57 which receives a tongue 59 that extends from the outer edge of half-frame 47. The abutting outer edges are sealed together by an adhesive and/or sealant 61. Instead of the adhesive and/or sealant 61, the outer edges may be welded.

The glass unit of FIG. 3 also includes first glass pane 63 and second glass pane 65 which are maintained in desired contact to the insulating glass sealants by a springy separator 67. An adhesive and/or sealant layer 69 hermetically seals the first half-frame 45 to the first glass pane 63, and an adhesive and/or sealant layer 71 hermetically seals the second half-frame 47 to the second glass pane 65.

FIG. 4 illustrates a glass unit wherein the half-frames are made from extruded sections and the unit includes a first-half frame 73 connected to a second half-frame 75 by hook portions of snap-acting locking members 77 and 79. A weld 81 seals the abutting outer edges of half-frames 73 and 75 together, and a first glass pane 83 is spaced away from second glass pane 85 by a non-spring action type of glass separator 87. An adhesive and/or sealant layer 89 seals the first half-frame 73 to first glass pane 83, and an adhesive and/or sealant layer 91 seals the second half-frame 75 to second glass pane 85.

A double leaf type of spring clip 93 is positioned continuously or intermittently around the edges of the glass panes 83 and 85, and alternate leaves press the glass panes against separator 87, while the other spring leaves press against half-frames 73 and 75 to center the glass panes within the frame and press the abutting outer edges of frames 73 and 75 together.

FIG. 5 illustrates another embodiment of glass unit, made by extruded sections, and includes a first half-frame 95 connected to second half-frame 97 by the hooked end portions of locking members 99 and 101. The outer abutting edges of half-frames 95 and 97 are sealed together by welded edge joint 103. First glass pane 105 is separated from second glass pane 107 by a non-spring type of glass separator 109, and adhesive and/or sealant layer 111 seals the first half-frame 95 to first glass pane 105, with an adhesive and/or sealant layer 113 sealing the second glass pane 107 to second half-frame 97. Shims 115 are positioned between first half-frame 95 and first glass pane 105 to separate the frame from the glass, and shims 117 are positioned between second half-frame 97 and second glass plane 107 for the same reason. The half-frames 95 and 97 are easier to snap together if the shims 115 and 117 are inserted after the snapping action, but the shims 115 and 117 could be inserted before the half-frames were snapped together if that were thought to be desirable.

A tape 119 may extend from the outer surfaces of glass panes 105 and 107 across the edges of the panes and the separator 109 to hold those elements together during assembly into the half-frames. These elements could also be held together during assembly by an adhesive on the separator's glass-contacting surfaces.

Figure 6:
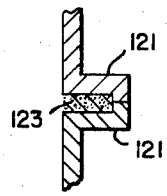
FIG. 6 is a partial view in section of a non-welded seal between the abutting edges of half-frames of the glass unit.

FIG. 6 illustrates another type of half-frame having outer abutting edges 121. The edges are sealed together by an adhesive and/or sealant layer 123.

In all illustrations, the perimeter sealing of the two half-frame assemblies, shown accomplished by welding in FIG. 2 at 43, FIG. 4 at 81, and FIG. 5 at 103, might also be accomplished by using adequate adhesive and/or sealing compounds. Two specific seals of this type are shown in FIG. 6 at 123, and FIG. 3 at 61. The type of sealing materials and joint constructions shown in these illustrations are not meant to limit this invention. Any permanently effective hermetically sealing material and joint design are acceptable.

FIG. 7 shows another type of glass separator 125 which is spring-like and is preferably made of metal. A snap-on cover 127 is provided which includes tabs 129 that prevent the cover from sliding into the body portion of the separator. A desiccant 131 may fill the glass separator 125 to free the air space between the glass panes or trapped moisture and/or volatile vapors.

FIG. 8 is a view in section showing another form of glass separator 133 which is made of a springy material positioned between glass panes 136, 137. Separator 133 includes a stop portion 135 adapted to contact the edge of glass pane 137 and prevent any possible movement of the separator in the direction indicated by arrow 139.

Referring to FIG. 2, spring separator 37 exerts an outward pressure on the inner faces of panes 33 and 35. This outward pressure is transferred by locking members 25 and 27 so that an inward pressure is exerted on the abutting edges of half-frames 21 and 23 to urge them together at weld 43.

Similarly, in FIG. 3, spring-type separator 67 exerts an outward pressure, against the inner faces of glass panes 63 and 65, which is transferred by locking members 49 and 53 to become an inward pressure on the abutting outer ends of half-frames 45 and 47, to thereby maintain compression on the seal between tongue 59 and groove 57.

The method of assembling the multiple pane, hermetically sealed insulating glass unit of the present invention will be described using the embodiment of FIGS. 1 and 2 as an example. The steps include forming a first-frame 21 having a snap-action locking member 25 extending therefrom, forming a second half-frame 23 having a snap-action locking member 27 extending therefrom, applying a sealant and/or adhesive 39 along the inner face of half-frame 21, applying the same type sealant and/or adhesive 41 along the inner face of half-frame 23, setting first glass pane 33 on the sealant layer 30 of first half-frame 21, setting second glass pane 35 on the sealant layer 41 of second half-frame 23, laying glass-separating member 37 along the edge of one of panes 33 and 35, positioning the other half-frame and pane over glass separating member 37, and pressing the half-frames together to cause the locking members 25 and 27 to snap together and lock the unit into a complete assembly.

Other steps in the assembly may include that of forming a vent hole 141 in half-frame 21 before pressing the half-frames 21 and 23 together, and then closing vent hole 141, as by welding, after the half-frames have been pressed together into locking position.

Another step in the method is that of hermetically sealing the abutting edges of half-frames 21 and 23. In FIG. 2, the abutting edges were sealed by applying a weld 43. In FIG. 3, this sealing was accomplished by inserting an adhesive and/or sealant 61.

Another step in the method is to add a quantity of desiccant 143 to the space enclosed by the half-frames.

Referring now to the embodiment of the invention illustrated by FIG. 5, the method of assembling that multiple glass unit includes the steps comprising forming a first half-frame 95 having a snap-action member 99 extending therefrom, forming a second half-frame 97 having a snap-action locking member 101 extending therefrom, applying a sealant layer 111 along the inner face of first half-frame 95, and applying a sealant layer 113 along the inner face of second half-frame 97. The method also includes the steps of connecting together a first glass pane 105 and second glass pane 107 by a non-spring type of glass separator 109, and holding these elements together by applying a tape 119 across the ends of the glass panes. Tape 119 holds the glass panes and separator together during assembly into the half-frames. A clip could be substituted for tape 119, if desired. These elements could also be held together during assembly by an adhesive on the separator's glass-contacting surfaces.

The assembly steps include setting the taped-together glass panes on second half-frame 97, positioning first half-frame 95 over glass pane 105, and pressing together the half-frames to cause locking members 99 and 101 to snap together and lock the unit into a complete assembly.

Another step in assembling the FIG. 5 unit includes that of applying shims 115 and 117 between glass pane 105 and half-frame 97 and between glass pane 107 and half-frame 97. Shims 115 and 117 separate the panes from the half-frames and may be applied either before the half-frames are snapped together or afterwards. If shims 115 and 117 are applied afterwards, then the adhesive and/or sealant 89 and 91 must also be applied after the assembly. The half-frames are easier to snap together if the shims 115 and 117 are applied afterwards.

The present invention provides a hermetically-sealed insulating glass unit having a frame which is an integral part of the sealing system. It is to be noted that the spring separators as shown in FIG. 2 as 37, FIG. 3 as 67, FIG. 7, and FIG. 8 as 133 are meant to be representative of the many different shapes that could be used to achieve the desired end result. Anything that will apply a constant outward force may be used. This outward force serves two main purposes. First it keeps the interlocking members and the frame edge seal tight. Second it keeps a constant pressure on the sealant between the glass and frame so that non-setting sealants such as a butyl sealant can be used. When a setting type of adhesive-sealant such as a polysulfide is used, it would be desirable to have shims such as 115, 117 in FIG. 5 between the glass and frame so that a uniform sealant gap is provided.

It is further to be noted that the double leaf type of spring clip 93 as shown in FIG. 4, and the resilient shims 115, 117 of FIG. 5 as shown, serve the dual purpose of keeping a constant outward force applied which locks the frames together and helps to maintain the edge seal, and also of providing a uniform width sealant and/or adhesive chamber. They do not exert pressure against the sealant and/or adhesive which is between the glass and the frame.

It is to be noted that the locking section of the half-frames serves as a pivot or fulcrum around which the force of the spring separator, or of spring clip 93 in the embodiment of FIG. 4, is transferred to the abutting outer edges of the half-frames to press them together and assist in maintaining the seal between those abutting edges when a non-welded joint is used.

The spring separators of the present invention keep a constant pressure against the glass panes and also against the outer edge seal of the frame, in a non-welded edge, so as to maintain the seal when using a non-setting sealant, thereby to prevent undue stresses on the glass unit from causing a seal failure.

This invention could also be used to make a premium quality, doubly protected insulated glass unit by using a standard insulating window unit as the glass and separator package, though it is presently felt that the extra cost involved would not be economically desirable.

It is to be further noted that by adding an extruded fin 140 in FIG. 5, the unit is complete and ready to be mounted into a window opening or curtain wall without additional framing members or complicated sealing procedures.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

What is claimed is:

1. A method of making hermetically sealed multiple pane insulating glass units comprising forming a first half-frame having snap-action locking means extending therefrom, forming a second half-frame having snap-action locking means extending therefrom, applying a sealant along the inner faces of each half-frame, setting a first glass pane on the sealant of the first half-frame, setting a second glass along the edge of one of the panes on the sealant of the second half-frame, laying a glass-separating member, and pressing the half-frames together to cause the locking means to snap together and lock the unit into a complete assembly.

2. The method of claim 1, including the steps of forming a vent hole in one of the half-frames before pressing the half-frames together, and closing the vent hole after the half-frames have been pressed together into locking position.

3. The method of claim 1, wherein the half-frames have outer edges which abut, including the steps of exerting an outward pressure on the inner faces of the panes by means of the glass-separating member, and transferring that outward pressure through the locking means to exert an inward pressure on the abutting edges of the half-frames to force them together.

4. The method of claim 1, wherein the half-frames have outer edges which abut, including the step of hermetically sealing the abutting edges of the half frames.

5. The method of claim 4, wherein the sealing of said edges is accomplished by welding.

6. The method of claim 4, wherein the sealing of said edges is accomplished by inserting an adhesive-sealant therebetween.

7. The method of claim 1, including the step of exerting outward pressure against the inside of the panes by means of said glass-separating member.

8. The method of claim 1, including the step of adding a desiccant prior to snap-locking the halves into a completed unit.

9. The method of claim 1, including forming mounting means on a half-frame to make a glass unit ready for glazing without additional elaborate sealing.

10. A method of making multiple pane insulating glass units comprising forming a first half-frame having a snap-action locking means extending therefrom, forming a second half-frame having a snap-action locking means extending therefrom, applying a sealant along the inner faces of each half-frame, setting on one of the half-frames a first and second glass pane having a separator therebetween and held together as a unit by a channel having both inwardly and outwardly projecting spring fingers, positioning the other half-frame over said glass panes, and pressing the half-frames together to cause the locking means to snap together and lock the unit into a complete assembly.

11. The method of claim 10 wherein the adhesive-sealant between the glass and frame is applied after snap-locking the halves together.

12. The method of claim 10, including the step of applying a shim between the glass panes and the half-frames to separate the panes from the half-frames.

13. The method of claim 12, including the step of applying a tape across the edges of the glass panes and separator to hold them together during assembly.

14. The method of claim 13, including the step of clipping the edges of the glass panes together to hold them together during assembly.

15. The method of claim 10, including forming mounting means on a half-frame to make a framed glass unit ready for glazing without additional elaborate sealing.

16. A hermetically sealed multiple pane insulating glass unit comprising a first glass pane, a second glass pane, a separator positioned between the panes and spacing them apart, a first continuous half-frame, a second continuous half-frame, a sealant positioned between the first half-frame and pane and between the second half-frame and pane, and snap-action locking means connecting the half-frames together.

17. The glass unit of claim 16, including means for hermetically sealing the half-frames.

18. The glass unit of claim 16, including means for exerting outward pressure on the inner faces of the panes.

19. The glass unit of claim 16, wherein the half-frames have outer edges which abut, and means are provided for sealing the abutting edges together.

20. The glass unit of claim 16, including means pressing the first pane against the separator and pressing the second pane against the separator.

21. The glass unit of claim 16, including a shim between the glass panes and the half-frames to separate the panes from the half-frames.

22. The glass unit of claim 16, including mounting means on a half-frame to make a glass unit ready for glazing without additional elaborate sealing.

23. A method of making hermetically sealed multiple pane insulating glass units comprising snap-locking two continuous half-frames together to form joints therebetween, and hermetically sealing the joints to make an insulating unit.

24. A hermetically sealed multiple pane insulating glass unit comprising two continuous half-frames, snap-locking means holding the half-frames together along joints, and means hermetically sealing the joints together.

25. A hermetically sealed multiple pane insulating glass unit comprising a first glass pane, a second glass pane, a separator positioned between the panes and spacing them apart, a first half-frame, a second half-frame, a sealant positioned between the first half-frame and pane and between the second half-frame and pane, and snap-action locking means connecting the half-frames together, said half-frames having outer edges which abut, and said half-frames including means for transferring said outward pressure to exert an inward pressure on the abutting edges of the half-frames to urge them together.

References Cited
UNITED STATES PATENTS

| | | | |
|---|---|---|---|
| 986,292 | 3/1911 | Hunter | 52—401 |
| 2,125,397 | 8/1938 | Owen | 52—628 |
| 2,974,377 | 3/1961 | Kunkle | 52—616 |
| 3,155,205 | 11/1964 | Place | 52—628 |
| 3,280,523 | 10/1966 | Stroud | 52—172 |

REINALDO P. MACHADO, *Primary Examiner.*